United States Patent [19]

Albrigtsen et al.

[11] 4,261,778
[45] Apr. 14, 1981

[54] METHOD OF PRODUCING SKIS

[75] Inventors: Bjornar Albrigtsen, Geithus; Alv Tverran, Honefoss, both of Norway

[73] Assignee: A/S Norske Skiprodukter, Honefoss, Norway

[21] Appl. No.: 73,071

[22] Filed: Sep. 6, 1979

Related U.S. Application Data

[63] Continuation of Ser. No. 835,641, Sep. 22, 1977, abandoned.

[30] Foreign Application Priority Data

Nov. 23, 1976 [NO] Norway ............................... 763998

[51] Int. Cl.³ ............................................... B29F 1/00
[52] U.S. Cl. ................................... 156/245; 9/310 D; 280/610
[58] Field of Search ............... 156/242, 245; 9/310 R, 9/310 B, 310 E, 310 D; 280/601, 608, 609, 610; 264/328

[56] References Cited

U.S. PATENT DOCUMENTS

| | | | |
|---|---|---|---|
| 3,258,795 | 7/1966 | Mailhot | 280/610 |
| 3,322,435 | 5/1967 | Kirschner | 280/610 |
| 3,393,918 | 7/1968 | Styka | 280/610 |
| 3,475,035 | 10/1969 | Nason | 280/610 |
| 3,542,388 | 11/1970 | Veneko | 280/610 |
| 3,543,315 | 12/1970 | Hoffman | 9/310 E |
| 3,635,482 | 1/1972 | Holman | 280/610 |
| 3,705,729 | 12/1972 | Arnsteiner | 280/610 |
| 3,823,956 | 7/1974 | Zechmeister et al. | 280/610 |
| 3,901,522 | 8/1975 | Boehm | 280/610 |
| 3,928,106 | 12/1975 | Molnar | 156/245 |
| 4,026,575 | 5/1977 | Harting | 280/610 |
| 4,071,264 | 1/1978 | Legrand et al. | 280/610 |
| 4,175,767 | 11/1979 | Schenuebl | 280/610 |

FOREIGN PATENT DOCUMENTS

| | | | |
|---|---|---|---|
| 385692 | 3/1965 | Fed. Rep. of Germany | 280/610 |
| 1355496 | 4/1963 | France | 280/610 |

*Primary Examiner*—Caleb Weston
*Attorney, Agent, or Firm*—Young & Thompson

[57] ABSTRACT

A method of producing skis of the type comprising a core of a lightweight material, e.g., lightweight wood, where layers of fiber-reinforced plastic, e.g., fiberglass-reinforced polyester, are provided on the top and bottom sides of the finished ski. A sole of a plastic material is glued to the lower fiber reinforced plastic layer. The sides of the core are covered with a protective layer of a plastic material, e.g., a hard polyurethane foam or a thermoplastic, for example, ABS (acrylic butadiene-styrene), which has been molded to the core in a mold. The core is placed near the top layer of fiber-reinforced plastic and at a distance from the lower layer of fiber-reinforced plastic. The space between the lower side of the core and the lower layer is formed and molded at the same time as the side edges are molded on.

2 Claims, 5 Drawing Figures

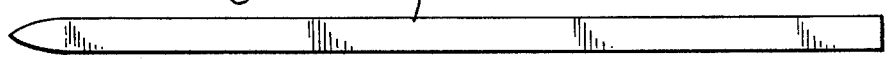
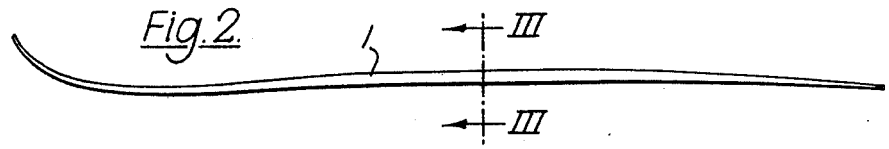
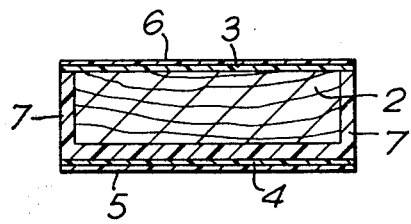
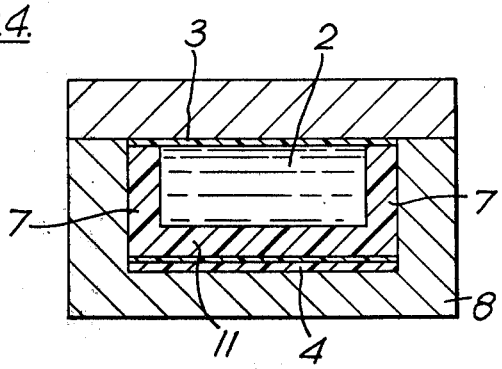
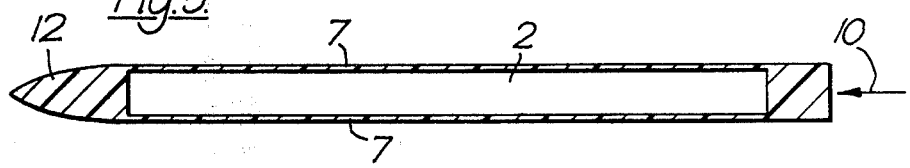

METHOD OF PRODUCING SKIS

This is a continuation, of application Ser. No. 835,641, filed Sept. 22, 1977, abandoned.

The present invention relates to a method of producing skis of the type comprising a core of a lightweight material, e.g., lightweight wood, to the top and under sides of which a layer of fiber-reinforced plastic, e.g., fiberglass-reinforced polyester, is joined, a sole of plastic being glued to said lower fiber-reinforced plastic layer, the upper fiber-reinforced plastic layer optionally being coated with a decorative layer, and the sides of the core being covered with a protective layer of a suitable material.

Use of skis of the above type, commonly called fiberglass skis, has become widespread in recent years. This type of ski has great practical advantages over the laminated wood skis which were most prevalent heretofore. For example, fiberglass skis are much stronger, because the fiberglass-reinforced plastic layers on the top and bottom of the ski have very great tensile strength. Thus, very large stresses indeed are necessary before such a ski will break, even though the plastic coatings measure only 1 mm or less in thickness and the nature of the core material itself is such that it can withstand only very small tensile forces. In addition, a ski of this type will be impervious to water on both the top and bottom sides.

Some ski manufacturers have also coated the side edges of the skis with a fiber-reinforced plastic coating. However, this has proved to be not only a very expensive operation, but also one that can easily result in an overly-rigid ski. The most common process, then, has been to apply several coats of a waterproof plastic lacquer to the side edges of the core material, which extends all the way out to the edge of the ski. However, this job is also time-consuming, and the lacquer is vulnerable to shocks and impact. If the lacquer on a portion of the side edge gets scraped off, the soft and vulnerable core material will be left exposed to absorb water, which will ruin it.

The object of the present invention is to provide directions for a method of producing skis of the above type, whereby in a practical, effective and simple manner the side edges are provided with a strong and durable covering layer which effectively protects the side edges of the core material against stresses, thus preventing water penetration into the core material. The method of the invention also provides a very smooth finish on the side edges of the ski so produced, thus completely eliminating the necessity of any final finishing work to achieve such a surface.

This is achieved according to the invention by a method of making skis of the type comprising a core of a lightweight material, e.g., a lightweight wood, where the top and bottom sides of the finished ski are provided with a layer of fiber-reinforced plastic, e.g., fiberglass-reinforced polyester, a sole of a plastic material being glued to the lower fiber-reinforced plastic layer and a decorative layer optionally being glued on top of the upper fiber-reinforced plastic layer, and where the side edges of the core material are covered with a protective layer of a plastic material, e.g., a hard polyurethane foam or a thermoplastic material, for example, ABS (acrylic butadiene-styrene), which is molded to the core in a mould, the method being characterized in that the core is placed near the top layer of fiber-reinforced plastic and at a distance from the lower layer of fiber-reinforced plastic, the space between the lower side of the core and the lower plastic layer being filled and molded at the same time as the molding of the side edges.

A practical further development of the invention is characterized in that the core is glued to the upper fiber-reinforced plastic layer before the core is placed in the mold cavity, and in that the two plastic layers are given a width and shape such that they extend all the way out to the edges of the finished ski.

The invention shall be further elucidated in the following with reference to the drawings.

FIG. 1 and 2 show plan and side view, respectively, of a ski.

FIG. 3 is a cross section through lines III—III of FIG. 2.

FIG. 4 is a schematic cross section through the injection molding tool containing the core and molded portions, and FIG. 5 shows a ski core with the side edges and tip molded on.

The ski consists primarily of a core 2 of a lightweight material, e.g., balsa wood or the like. A layer 3 of fiber-reinforced plastic has been glued to the top side of the core material. A similar layer 4 is positioned beneath the under side of the core. A sole 5 is glued to the bottom of the lower fiber-reinforced plastic layer 4. The sole can be made of a cross-linked thermoplastic or a composite material containing small fibers which break through the surface layer. On the top side of the upper fiber-reinforced plastic layer 3, a finish or decorative layer 6 may optionally be glued on. In accordance with the invention covering layers 7 of plastic have been molded to the side edges of the core. The surface of these plastic layers is such that it renders any final finishing work unnecessary.

FIG. 4 illustrates the method of the invention, where, in connection with the molding of the side edges 7, a layer 11 is also formed on the lower side of the core 2. This lower layer will be continuous with the side portions 7. The upper 3 and lower 4 plastic layers are molded and bonded to the plastic layers 7 and 11. The upper layer 3 can be already glued in place on the core, while the lower layer 4 will be placed in the mold 8. Alternately, the gluing of the layers to the core can be carried out after the coated core is removed from the mold.

Preferably, the core 2 is made shorter than the finished ski. The ski 1 is very thin at the ends, and if the core were to extend into these sections it would have to be quite thin and thus would be difficult to produce, as well as being very vulnerable to damage during production. It is therefore practical to make the core shorter than the finished ski. The portions of the ski lacking at the ends, for example, the portion 12 at the tip, can then be molded at the same time as the side edges 7 by means of injection molding. The mass is injected in from the back, as indicated by the arrow 10.

With the method of the invention, fiber-glass skis can be produced in a very efficient manner. The edges of the skis so produced are very well protected, and are given a final finish during the injection molding process, so that any additional finishing work, such as lacquering the side edges, is rendered unnecessary. The covering layers 3 and 4 can be produced to the precisely accurate width, so that no final finishing on the edges of these is required, either.

Having described our invention, we claim:

1. A method of producing a ski that has a curved forward portion and a relatively thin rear portion, comprising producing a core of lightweight material which is narrower than the ski to be produced and which lacks said curved forward and relatively thin rear portions, placing said core in the cavity of a mold that has substantially the shape of the ski to be produced, with the forward end of the core spaced from the forward end of the mold by about the length of said curved forward portion and the rear end of the core spaced from the rear end of the mold by about the length of said relatively thin rear portion and the side edges of the core spaced from both side walls of the mold, placing layers of reinforcing material in the mold above and below the core at the top and bottom of the mold with lower one of said layers spaced from the core, cementing the upper one of said layers to the core prior to the insertion of the core into the mold, said upper layer extending full width of the mold, thereby to space the side edges of the core from both side walls of the mold, injecting a hardenable plastic material into said mold between said layers to fill said mold thereby to produce from said plastic material said curved forward portion and said relatively thin rear portion and layers of plastic along both side edges of said core and between said core and said lower layer, and removing said ski from said mold.

2. A method as claimed in claim 1, in which said layers are fiber-reinforced plastic.

* * * * *